US011912000B2

(12) United States Patent
Puchois et al.

(10) Patent No.: US 11,912,000 B2
(45) Date of Patent: Feb. 27, 2024

(54) MULTILAYER FILM FOR RESEALABLE PACKAGING WITH IMPROVED RESEALING

(71) Applicant: BOSTIK SA, Colombes (FR)

(72) Inventors: Romain Puchois, Venette (FR); Christophe Robert, Venette (FR)

(73) Assignee: BOSTIK SA, Colombes (FR)

( * ) Notice: Subject to any disclaimer, the term of this patent is extended or adjusted under 35 U.S.C. 154(b) by 221 days.

(21) Appl. No.: 17/292,088

(22) PCT Filed: Oct. 24, 2019

(86) PCT No.: PCT/FR2019/052539
§ 371 (c)(1),
(2) Date: May 7, 2021

(87) PCT Pub. No.: WO2020/094945
PCT Pub. Date: May 14, 2020

(65) Prior Publication Data
US 2021/0402746 A1 Dec. 30, 2021

(30) Foreign Application Priority Data
Nov. 8, 2018 (FR) ...................... 1871410

(51) Int. Cl.
B32B 27/08 (2006.01)
B32B 7/12 (2006.01)
B32B 27/30 (2006.01)
B32B 27/32 (2006.01)
B32B 27/36 (2006.01)

(52) U.S. Cl.
CPC ............... *B32B 27/08* (2013.01); *B32B 7/12* (2013.01); *B32B 27/302* (2013.01); *B32B 27/32* (2013.01); *B32B 27/36* (2013.01); *B32B 2250/24* (2013.01); *B32B 2270/00* (2013.01); *B32B 2307/582* (2013.01); *B32B 2307/7244* (2013.01); *B32B 2307/7246* (2013.01); *B32B 2439/70* (2013.01)

(58) Field of Classification Search
None
See application file for complete search history.

(56) References Cited

U.S. PATENT DOCUMENTS

| 10,000,043 | B2 * | 6/2018 | Robert | B32B 37/04 |
| 2008/0032148 | A1 | 2/2008 | Lee et al. | |
| 2013/0052471 | A1 | 2/2013 | Botros | |
| 2014/0322542 | A1 * | 10/2014 | Botros | B32B 27/327 |
| | | | | 428/476.1 |
| 2015/0336362 | A1 * | 11/2015 | Robert | B32B 7/12 |
| | | | | 428/335 |

FOREIGN PATENT DOCUMENTS

| EP | 2946920 A1 | 11/2015 |
| JP | S5986651 A | 5/1984 |
| JP | H01167388 A | 7/1989 |
| JP | 2003175567 A | 6/2003 |
| JP | 2007253395 A | 10/2007 |
| JP | 2016005903 A | 1/2016 |
| JP | 2018138638 A | 9/2018 |

OTHER PUBLICATIONS

International Search Report dated Feb. 19, 2020 issued in corresponding PCT/FR2019/052539 application (2 pages).

* cited by examiner

*Primary Examiner* — Sheeba Ahmed
(74) *Attorney, Agent, or Firm* — Millen, White, Zelano & Branigan, P.C.; Csaba Henter

(57) ABSTRACT

1) Multilayer film comprising 2 thin layers D and E of a thermoplastic material bonded together by a continuous layer A consisting of a hot-melt pressure-sensitive adhesive composition comprising:
from 40% to 70% by weight of a composition of styrene block copolymers consisting of a mixture of diblock and triblock copolymers; and
from 30% to 60% by weight of one or more tackifying resins;
said multilayer film being such that the adhesive layer A is:
connected to the layer D by means of a tie layer B, and
connected to the layer E by means of a tie layer C,
each of the 2 layers B and C respectively consisting of a composition (b) and (c) each comprising:
a polyolefin (P) chosen from a polyethylene (PE) and a polypropylene (PP), optionally modified with an unsaturated carboxylic anhydride; and
at least one elastomer compound (EL) chosen from a copolymer of ethylene and of propylene (EL1) and a styrene block copolymer (EL2) comprising at least one elastomer block.
2) Process for producing said film by coextrusion.
3) Use of said film for producing resealable packagings.

19 Claims, No Drawings

MULTILAYER FILM FOR RESEALABLE PACKAGING WITH IMPROVED RESEALING

The subject of the present invention is a multilayer film comprising a layer consisting of an extrudable, hot-melt pressure-sensitive adhesive composition, a process for producing said film, and also the use thereof for producing resealable packagings (or trays), intended in particular for the packaging of foodstuffs, in particular perishable foodstuffs.

Extrudable hot-melt pressure-sensitive adhesive compositions intended for use in the production of resealable packagings (or trays) are known from applications WO 02/064694, WO 12/045950, WO 12/045951 and WO 14/020243.

Resealable packagings, for example in the form of trays or bags, are used in the food-processing industry and large-scale distribution for packaging perishable foodstuffs, in particular fresh products. Such packagings are also described by patent EP 1 053 952.

After the packaging has been opened for the first time and a portion of the food product that it contains has been consumed, the consumer can manually reseal the packaging substantially hermetically and can consequently, as appropriate, after placing it in a refrigerator, preserve the remaining portion of the product. A sequence of reopenings and resealings is also possible.

These packagings generally comprise a container (or receptacle) and a seal forming a lid, which are hermetically attached to one another by welding.

The more or less deep and relatively rigid receptacle consists of a multilayer sheet (also referred to as complex or composite sheet) having a minimum thickness of 200 µm, in general of between 200 and 1000 µm. This sheet is thermoformed so as to have a flat bottom on which the food product rests, and a perimeter in the form of a flat band. This perimeter, which is generally parallel to the bottom, is bonded by welding to the flexible and flat seal, which consists of a multilayer film (also described as complex or composite film) which has a thickness of generally between 40 and 150 µm, and which is sometimes denoted by the name sealing film.

During the opening of the packaging, the sealing film is manually separated from the receptacle at the flat band of the perimeter. This operation reveals an adhesive layer at this flat band, both on the sealing band and on the receptacle band which were previously in contact. These two (continuous or noncontinuous) adhesive layers, referred to as "daughters", result from the rupturing of an initial or "mother" adhesive layer or, optionally, from its separation (or detachment) from one of the two layers of the multilayer complex film which are adjacent to it. The initial adhesive layer is therefore one of the layers of said multilayer complex film which is itself an element included either in the composite sheet which constitutes the receptacle or, preferably, in the sealing film.

The two daughter adhesive layers that are present, after the packaging has been opened, on the bands located on the respective perimeter of the receptacle and of the seal are therefore facing one another. Thus, it is sufficient to reposition the seal on the receptacle, in accordance with their position in the packaging before opening, in order to bring the two bands of daughter adhesive layers back into contact. Simple manual pressure then makes it possible to obtain resealing of the packaging.

The adhesive composition which constitutes the mother and daughter adhesive layers is thus necessarily a pressure-sensitive adhesive (PSA).

The extrudable pressure-sensitive adhesive compositions described in the aforementioned applications are hot-melt compositions comprising a tackifying resin and a styrene block copolymer including an elastomer block. The hot-melt pressure-sensitive adhesive compositions are also commonly referred to as HMPSAs, corresponding to the initials of the term "Hot-Melt Pressure-Sensitive Adhesive". They are substances which are solid at ambient temperature and which contain neither water nor solvent. Applied in the molten state, they solidify as they cool thus forming an adhesive layer which provides the bonding between the 2 thin layers of thermoplastic polymeric material to be assembled, while at the same time providing the corresponding packaging with the advantageous opening and resealing properties.

Moreover, these hot-melt press-sensitive adhesive (or HMPSA) compositions, which are prepared by hot mixing their ingredients, have the additional advantage of being able to be made into the form of granules (of size between 1 and 10 mm) by means of an extrusion step carried out directly under hot conditions after the mixing step, for example by means of a twin-screw extruder fitted with a tool for cutting the extruded product.

By virtue of the granules thus obtained, the three-layer film which consists of the layer of hot-melt pressure-sensitive adhesive composition and the 2 thin layers of thermoplastic polymeric material to be assembled, can be conveniently produced by coextrusion, by feeding for example a bubble-blowing device with the constituent materials of the 3 layers in the form of granules of size defined above.

The ease of opening of such packagings is closely linked to the properties of the PSA and more particularly to the force that must be applied, during the opening of the packaging (hereinafter referred to as first opening), in order to obtain the rupturing of the mother adhesive layer and/or the separation thereof from one of the 2 layers which are adjacent to it in the multilayer composite film mentioned above.

The capacity of the packaging to reseal and the quality of the resealing obtained (hereinafter referred to as first resealing) are also important for having once again a substantially hermetic packaging which is therefore capable of ensuring the preservation of its contents. The quality of the first resealing is also closely linked to the properties of the PSA. It is evaluated by the force that must be applied, during the reopening (hereinafter denoted as second opening), in order to obtain once again the rupturing and/or the detachment of the adhesive layer that was formed by the repositioning of the 2 daughter adhesive layers, following the manual pressure applied on the perimeter of the packaging.

Patent application EP 1 053 952 teaches a resealable packaging with a container which comprises a complexable layer, an adhesive layer and a tear-off sealing layer. This adhesive is a pressure-sensitive adhesive which is described in a very general way.

Application US2013/0029553 describes a multilayer film for resealable packagings comprising a heat-sealable layer consisting of a specific amorphous polyethylene terephthalate, a layer of PSA, and at least one tie layer consisting of a copolymer of ethylene and of methyl acrylate.

Application WO 12/045951 discloses a multilayer film comprising 2 thin layers of thermoplastic materials bonded together by a layer of an adhesive composition based on styrene block copolymers, said layer having a thickness of between 7 and 300 µm. This multilayer film, which is suitable for the production of resealable packagings, makes it easier to open the latter, by lowering the force of first opening, while maintaining substantially at the same level the quality of the subsequent resealing (or first resealing).

Application EP 2 946 920 describes a multilayer film which comprises, in addition to the 2 thin layers D and E of a thermoplastic material and the layer of hot-melt pressure-sensitive adhesive composition A which binds them together, 2 tie layers B and C which are inserted between, on the one hand, the layer A and, on the other hand, respectively, the layers D and E, giving the resulting multilayer film a D/B/A/C/E structure. Said layers B and C consist of a composition based on a polyethylene (PE) or polypropylene (PP) modified with a cyclic anhydride of an unsaturated acid, such as maleic anhydride, and in particular a PE grafted with maleic anhydride.

Such a multilayer film advantageously makes it possible to improve the resealing performance of the corresponding packagings, while maintaining easy first opening. The increase in resealing performance, and in particular the quality of the first resealing, thus provides the consumer who has carried out the $1^{st}$ opening of the resealable packaging in order to consume part of the contents, with a more efficient preservation of the remaining portion of the perishable food product.

One objective of the invention is to provide new tie layers, resulting in a multilayer system suitable for the production of resealable packaging, which make it possible—while maintaining easy first opening of the packaging—to improve the quality of the resealing (or first resealing) of said packaging, so as to provide the consumer more effectively with preservation of the remaining portion of the perishable food product.

Another objective of the invention is to increase the force of the second opening, while maintaining the force of the first opening at an acceptable level.

Another objective of the present invention is to provide a multilayer film which makes it possible to achieve the above objectives at ambient temperature, corresponding to the temperature at which the consumer opens and reseals the packaging.

Another objective of the present invention is to provide a multilayer film capable of being produced by coextrusion from raw materials conditioned in the form of granules, in particular by bubble-blowing coextrusion, for the purpose of producing a resealable packaging.

It has presently been found that these objectives can be totally or partly obtained by means of the multilayer film according to the invention which is described hereinafter.

A subject of the present invention is therefore first of all a multilayer film comprising 2 thin layers D and E of a thermoplastic material bonded together by a continuous layer A which has a thickness ranging from 7 to 50 µm, and consists of a hot-melt pressure-sensitive adhesive composition (a) comprising, on the basis of the total weight of said composition:

from 40% to 70% by weight of a composition (a1) of styrene block copolymers comprising at least one elastomer block, said composition (a1) consisting, on the basis of its total weight:
of 30% to 90% by weight of at least one diblock copolymer chosen from the group comprising SI, SBI, SIB, SB, SEB and SEP, and
of 10% to 70% by weight of at least one triblock copolymer chosen from the group comprising SIS, SIBS, SBS, SEBS and SEPS;

the total content of styrene units of said composition (a1) ranging from 10% to 40% by weight on the basis of the total weight of (a1); and
from 30% to 60% by weight of one or more tackifying resins (a2);
said multilayer film being further characterized in that the adhesive layer A is:
connected to the layer D by means of a tie layer B, and connected to the layer E by means of a tie layer C;
each of the 2 layers B and C respectively consisting of a composition (b) and (c) each comprising:
a polyolefin (P) chosen from a polyethylene (PE) and a polypropylene (PP), optionally modified with an unsaturated carboxylic anhydride which is either a ring comprising 4 or 5 carbon atoms or a linear chain comprising 6 or 8 carbon atoms; and
at least one elastomer compound (EL) chosen from a copolymer of ethylene and of propylene (hereinafter EL1) and a styrene block copolymer (hereinafter EL2) comprising at least one elastomer block.

In addition to the percentages indicated above, all the percentages generally used in the present text to denote the amounts of ingredients of a composition correspond, unless otherwise indicated, to percentages expressed by weight on the basis of the total weight of said composition.

The characteristics of layers A, B, C, D and E included in the multilayer film according to the invention are now described in more detail below.

Description of the Constituent Composition (a) of the Adhesive Layer A:

Composition (a1) of Styrene Block Copolymers Comprising at Least One Elastomer Block:

The composition (a1) of styrene block copolymers comprising at least one elastomer block, which is included in the constituent HMPSA composition (a) of the adhesive layer A itself consists, on the basis of its total weight:
of 30% to 90% by weight of at least one diblock copolymer chosen from the group comprising SI, SBI, SIB, SB, SEB and SEP, and
of 10% to 70% by weight of at least one triblock copolymer chosen from the group comprising SIS, SIBS, SBS, SEBS and SEPS;

The styrene block copolymers used have a weight-average molar mass Mw of generally between 50 kDa and 500 kDa.

These styrene block copolymers consist of blocks of various polymerized monomers including at least one polystyrene block, and are prepared by radical-polymerization techniques.

Unless otherwise indicated, the weight-average molar masses $M_w$ that are given in the present text are expressed in daltons (Da) and are determined by Gel Permeation Chromatography, the column being calibrated with polystyrene standards.

The triblock copolymers include 2 polystyrene blocks and 1 elastomer block. They can have various structures: linear, star (also called radial), branched or else comb. The diblock copolymers include 1 polystyrene block and 1 elastomer block.

The triblock copolymers have the general formula:

$$ABA \qquad (I)$$

wherein:
A represents a styrene (or polystyrene) non-elastomer block, and
B represents an elastomer block which may be:

polyisoprene. The block copolymer then has the structure: polystyrene-polyisoprene-polystyrene and has the name: SIS;

polyisoprene followed by a polybutadiene block. The block copolymer then has the structure: polystyrene-polyisoprene-polybutadiene-polystyrene and has the name: SIBS;

polybutadiene. The block copolymer then has the structure: polystyrene-polybutadiene-polystyrene and has the name: SBS;

totally or partially hydrogenated polybutadiene. The block copolymer then has the structure: polystyrene-poly(ethylenebutylene)-polystyrene and has the name: SEBS;

totally or partially hydrogenated polyisoprene. The block copolymer then has the structure: polystyrene-poly(ethylenepropylene)-polystyrene and has the name: SEPS.

The diblock copolymers have the general formula:

$$A-B \qquad (II)$$

wherein A and B are as defined above.

When the composition (a1) comprises several triblock styrene copolymers, the latter being chosen from the group comprising SIS, SBS, SEPS, SIBS and SEBS, it is clearly understood that said triblocks can belong to just one or to several of these 5 copolymer families. The same is true, mutatis mutandis, for the diblock copolymers.

It is preferred to use a composition (a1) comprising a triblock copolymer and a diblock copolymer having the same elastomer block, owing in particular to the fact that such blends are commercially available.

According to one particularly preferred implementation variant, the content of diblock copolymer in the composition (a1) can range from 40% to 90%, preferably from 50% to 90%, even more preferentially from 50% to 60%.

According to one particularly advantageous embodiment of the constituent composition (a) of the layer A included in the multilayer film according to the invention, the composition (a1) consists of an SIS triblock copolymer and of an SI diblock copolymer. In this case, the total content of styrene units in the composition (a1) preferably ranges from 10% to 20%.

The triblock copolymers included in the composition (a1) preferably have a linear structure.

The styrene block copolymers comprising an elastomer block, in particular of SI and SIS type, that can be used in the composition (a) are commercially available, often in the form of triblock/diblock blends.

Kraton® D1113BT from Kraton and Quintac® 3520 from Zeon Chemicals are examples of compositions (a1) consisting of SIS and SI.

Kraton® D1113BT is a composition of which the overall content of styrene units is 16%, and which consists of 45% of linear SIS triblock copolymer of $M_w$ approximately 250 kDa, and 55% of SI diblock copolymer of $M_w$ approximately 100 kDa. Quintac® 3520 is a composition which consists, respectively, of 22% and of 78% of linear SIS triblock ($M_w$ approximately 300 kDa) and of SI diblock ($M_w$ approximately 130 kDa), and the total content of styrene units of which is 15%.

Tackifying Resins (a2):

The constituent HMPSA composition (a) of the layer A also comprises one or more tackifying resins (a2).

The tackifying resin(s) (a2) that can be used have weight-average molar masses $M_w$ of generally between 300 and 5000 Da and are chosen in particular from:

(i) rosins of natural origin or modified rosins, such as, for example, the rosin extracted from pine gum, wood rosin extracted from tree roots and derivatives thereof which are hydrogenated, dehydrogenated, dimerized, polymerized or esterified with monoalcohols or polyols, such as glycerol;

(ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;

(iii) terpene resins generally resulting from the polymerization of terpene hydrocarbons, such as, for example, monoterpene (or pinene), in the presence of Friedel-Crafts catalysts, which are optionally modified by the action of phenols;

(iv) copolymers based on natural terpenes, for example styrene/terpene, α-methylstyrene/terpene and vinyltoluene/terpene.

According to one preferred variant, the softening temperature (or point) of the tackifying resins that can be used in the composition according to the invention can range from 5 to 140° C. The softening temperature is determined in accordance with the standardized test ASTM E 28, the principle of which is as follows. A brass ring with a diameter of approximately 2 cm is filled with the resin to be tested, in the molten state. After cooling to ambient temperature, the ring and the solid resin are placed horizontally in a thermostated glycerol bath, the temperature of which can vary by 5° C. per minute. A steel ball with a diameter of approximately 9.5 mm is centered on the disk of solid resin. The softening temperature is, during the phase of rise in temperature of the bath at a rate of 5° C. per minute, the temperature at which the disk of resin yields by a height of 25.4 mm under the weight of the ball.

According to one preferred variant, use is made of aliphatic resins belonging to categories (ii) or (iii) for which mention may be made, as examples of commercially available resin, of:

(ii) Escorez® 1310 LC available from Exxon Chemicals, which is a resin obtained by polymerization of a mixture of unsaturated aliphatic hydrocarbons having approximately 5 carbon atoms, and which has a softening temperature of 94° C. and a weight-average molar mass Mw of approximately 1800 Da; Escorez® 5400 also from Exxon Chemicals, which is a resin obtained by polymerization then hydrogenation of a mixture of unsaturated aliphatic hydrocarbons having approximately 9 or 10 carbon atoms and which has a softening temperature of 100° C. and a Mw of approximately 570 Da;

(iii) Dercolyte® S115 available from Dérivés Résiniques et Terpéniques (or DRT), which is a terpene resin having a softening temperature of 115° C. and a Mw of approximately 2300 Da.

According to one preferred variant, the constituent HMPSA composition (a) of the layer A essentially consists of:

from 40% to 70% of the composition (a1) of styrene block copolymers; and from 30% to 60% of at least one tackifying resin (a2) having a softening temperature of between 5 and 140° C.

According to another preferred variant, the constituent HMPSA composition (a) of the layer A comprises or essentially consists of:

from 50% to 70% of the composition (a1) of styrene block copolymers; and from 30% to 50% of at least one tackifying resin (a2) having a softening temperature of between 5 and 140° C.

According to yet another preferred variant, the constituent HMPSA composition (a) of the layer A can also comprise, in addition to the composition (a1) and the tackifying resin(s) (a2), from 0.1% to 2% of one or more stabilizers (or antioxidants). These compounds are introduced in order to protect the composition from degradation resulting from a reaction with oxygen which is liable to be formed by the action of heat, light or residual catalysts on certain starting materials, such as the tackifying resins. These compounds can include primary antioxidants, which trap free radicals and are generally substituted phenols, such as Irganox® 1010 from Ciba. The primary antioxidants can be used alone or in combination with other antioxidants, such as phosphites, for instance Irgafos® 168 also from Ciba, or else with UV-stabilizers such as amines.

The composition (a) can also comprise a plasticizer, but in an amount not exceeding 5%. As plasticizer, use may be made of a paraffinic and naphthenic oil (such as Primol® 352 from ESSO) optionally comprising aromatic compounds (such as Nyflex 222B).

Finally, the composition (a) can comprise mineral or organic fillers, pigments or dyes.

The melt flow index (MFI) of the hot-melt pressure-sensitive adhesive composition (a) of the layer A is measured at 190° C. and for a total weight of 2.16 kg, in accordance with condition d) of the standard ISO 1133. The MFI is the weight of composition (previously placed in a vertical cylinder) that flows in 10 minutes through a die with a fixed diameter, under the effect of a pressure exerted by a charged piston having the total weight of 2.16 kg. Unless otherwise mentioned, the MFI values indicated in the present text were measured under these same conditions.

The hot-melt pressure-sensitive adhesive compositions of the layer A having an MFI ranging from 2 to 100 g/10 minutes are more particularly preferred.

Description of the Constituent Compositions (b) and (c) of, Respectively, the Tie Layers B and C:

The tie layers B and C are also denoted by the term "intermediate layers".

These 2 layers respectively consist of compositions (b) and (c), which may be identical or different, each comprising:

a polyolefin (P) chosen from a polyethylene (PE) and a polypropylene (PP), optionally modified with an unsaturated carboxylic anhydride which is either a ring comprising 4 or 5 carbon atoms or a linear chain comprising 6 or 8 carbon atoms; and at least one elastomer compound (EL) chosen from a copolymer of ethylene and of propylene (hereinafter EL1) and a styrene block copolymer (hereinafter EL2) comprising at least one elastomer block.

According to one embodiment, each of the compositions (b) and (c) comprises and, according to one preferred variant, consists essentially of:

from 50% to 98% by weight of the polyolefin (P); and
from 2% to 50% by weight of the elastomer compound (EL);

based on the total weight of said composition.

A more particularly preferred range is:

from 55% to 97% by weight of the polyolefin (P); and
from 3% to 45% by weight of the elastomer compound (EL).

Polyolefin (P):

The polyolefin (P) is chosen from a polyethylene (PE) and a polypropylene (PP), optionally modified with an unsaturated carboxylic anhydride which is either a ring comprising 4 or 5 carbon atoms or a linear chain comprising 6 or 8 carbon atoms.

(PE) is a homopolymer (or a copolymer) of polyethylene which can include a linear polyethylene such as HDPE (High Density PolyEthylene), a linear low density polyethylene (LLDPE), very low density polyethylene (VLDPE) or ultra low density polyethylene (ULDPE), or a branched polyethylene such as low density polyethylene (or LDPE). Such polyethylenes can be prepared by several methods, including polymerization in the presence of a Ziegler-Natta catalyst, metallocene-catalyzed polymerization, and radical polymerization.

The (PE) or the (PP) included in the compositions (b) and (c) of the tie layers (B) and (C) can optionally be modified with an unsaturated carboxylic anhydride which is either a ring comprising 4 or 5 atoms of carbon or a linear chain comprising 6 or 8 carbon atoms.

Mention may be made, as cyclic unsaturated carboxylic anhydride comprising 4 or 5 carbon atoms, of the following compounds:

maleic anhydride of formula:

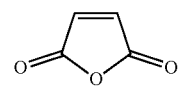

itaconic anhydride of formula:

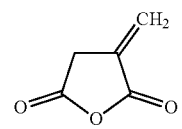

citraconic anhydride of formula:

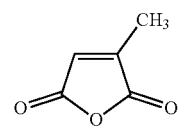

Mention may be made, as linear unsaturated carboxylic anhydride comprising 6 or 8 carbon atoms, of the following compounds:

crotonic anhydride of formula:

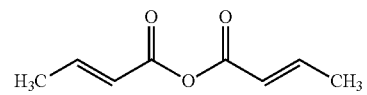

acrylic anhydride of formula:

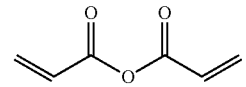

Maleic anhydride is a most particularly preferred anhydride.

The polyolefin (P) is preferably a (PE), which can optionally be modified with the unsaturated carboxylic anhydride as defined above.

The term "polyethylene modified" with said anhydride is understood to denote either a copolymer of ethylene and of said anhydride, or a homopolymer or copolymer of ethylene grafted with said anhydride.

The copolymers of ethylene and of anhydride are, for example, random copolymers comprising:
  a repeating unit derived from ethylene,
  a repeating unit derived from the anhydride, and optionally
  a repeating unit derived from an alpha-olefin which may have from 3 to 20 carbon atoms. The alpha-olefins used can be propylene, 1-butene, 1-hexene, 4-methyl-1-pentene, 1-octene, 1-decene, 1-tetradecene and 1-octadecene.

The copolymers of ethylene and of anhydride can comprise from 0.3% to 20% by weight of the anhydride defined above, and—when the corresponding comonomer is present—from 20% to 30% by weight of alpha-olefin. The repeating unit derived from ethylene can represent from approximately 20%, 40% or 50% to approximately 70%, 80%, 90% or 95% by weight of the copolymer.

The grafted ethylene homopolymers (or copolymers) are prepared by reacting an already formed ethylene (co)polymer with the compound to be grafted by heating, with or without a free-radical-generating catalyst (such as an organic peroxide) and in the presence or absence of a solvent.

None of the constituent atoms of the grafted radical, often added by a radical reaction, is incorporated into the main chain of the ethylene (co)polymer. The grafted radical is connected, as a pendent group, to certain repeating units of the main chain of the (co)polymer.

The ethylene polymer which is grafted with the anhydride is either a homopolymer or a copolymer. Such a copolymer is for example a random copolymer comprising, in addition to the repeating unit derived from ethylene, a repeating unit derived from an alpha-olefin as defined above.

According to a first variant embodiment, the polyolefin (P) included in at least one of the compositions (b) and (c) is a (PE), preferably an (LDPE).

According to a second implementation variant, the polyolefin (P) included in at least one of the compositions (b) and (c) is a (PE) grafted with maleic anhydride, preferably an (LLDPE) grafted with maleic anhydride.

Many polyethylenes modified with maleic anhydride are commercially available.

Mention may be made of Bynel® 4206 sold by DuPont, which is an LLDPE modified with maleic anhydride, or even Orevac® 18360 sold by Arkema and Bynel® 41E865 from DuPont, which are both maleic anhydride-grafted LLDPEs.

According to one preferred variant, the modified polyethylene included in the compositions (b) and (c) is a grafted ethylene homopolymer or copolymer.

Elastomer Compound (EL):

The elastomer compound (EL) is chosen from a copolymer of ethylene and of propylene (EU) and a styrene block copolymer (EL2) comprising at least one elastomer block.

According to a $1^{st}$ embodiment, the elastomer compound (EL) is a copolymer of ethylene and of propylene (EL1).

The copolymers of ethylene and of propylene (also known as ethylene propylene rubber) form a class of synthetic rubbers used in the fields of motor vehicle engines, electrical wiring and construction. They are prepared by polymerization of ethylene and of propylene in solution in an organic solvent (such as hexane) in the presence of a Ziegler-Natta catalyst. The ethylene content by weight is usually within from 40% to 65% by weight, on the basis of the total weight of monomers used. Copolymers of ethylene and of propylene are also widely commercially available.

According to one advantageous variant of this Pt embodiment, at least one of the constituent compositions (b) and (c) of the tie layers B and C comprises, and preferably consists essentially of:
  from 50% to 85% by weight of (PE) grafted with maleic anhydride, preferably from 50% to 70%; and
  from 15% to 50% by weight of (EL1), preferably from 30% to 50%, even more preferentially from 35% to 45%.

The (LLDPE) grafted with maleic anhydride is most particularly preferred as (PE) in the case of this variant.

Such a mixture is also commercially available. Mention may be made of the product Admer™ AT1955E available from Mitsui Chemicals, which is a composition consisting essentially of approximately 55%-60% by weight of maleic anhydride-grafted LLDPE and 40%-45% by weight of ethylene propylene rubber.

According to a $2^{nd}$ embodiment, the elastomer compound (EL) is a styrene block copolymer (EL2) comprising at least one elastomer block.

Said styrene block copolymer is as defined above for the constituent HMPSA composition (a) of the adhesive layer A, and is provided, according to a preferred variant of the invention, in the form of a diblock and triblock composition which is itself as defined above for composition (a1), and which may be identical to or different than (a1).

According to one advantageous variant of this $2^{nd}$ embodiment, at least one of the constituent compositions (b) and (c) of the tie layers B and C comprises, and preferably consists essentially of:
  from 70% to 98% by weight of (PE), preferably from 80% to 97%; and
  from 2% to 30% by weight of (EL2), preferably from 3% to 20%.

(LDPE) is most particularly preferred as (PE) in the case of this variant.

According to one preferred variant of the invention, the styrene block copolymer (EL2) is itself included in an HMPSA composition which also comprises one or more tackifying resins and which is itself as defined above for the HMPSA composition (a), and which may be identical to or different than (a).

Preferably, the styrene block copolymer (EL2) is included in an HMPSA composition which is identical to the constituent HMPSA composition (a) of the adhesive layer A.

According to an equally preferred variant, the compositions (b) and (c) of the layers B and C are identical.

Description of the Constituent Composition of the Layers D and E:

The adhesive layer A makes it possible, by means of the tie layers B and C, to ensure the bonding between a thin complexable layer D and a thin sealable and splittable layer E.

The complexable layer can be complexed (or laminated) with other layers for the preparation of the packaging, for example with a rigid layer for preparing the receptacle.

The sealable and splittable layer ensures, at the periphery along which the receptacle is bonded by welding to the seal, the first opening of the packaging, by means of a splittable weakened zone. After opening, the weakened zone reveals:

the mother adhesive layer on the seal strip and/or on the receptacle strip which were in contact in the closed packaging, and/or 2 daughter adhesive layers resulting from the rupture of the mother adhesive layer and located on the seal strip and/or the receptacle strip.

The material that can be used to constitute the 2 layers D and E is generally a thermoplastic polymer (identical or different for the 2 layers) such as:
- polyethylene (PE),
- polypropylene (PP),
- a copolymer based on ethylene and propylene,
- polyamide (PA),
- polyethylene terephthalate (PET), or else
- a copolymer based on ethylene, for instance a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
- polystyrene (PS),
- polyvinyl chloride (PVC),
- polyvinylidene fluoride (PVDF),
- a lactic acid polymer (PLA), or
- a polyhydroxyalkanoate (PHA).

To constitute the 2 layers D and E, use is preferably made of a polyolefinic material, and most particularly PE, and even more preferentially a low-density PE (also denoted Low Density PolyEthylene or LDPE).

The thickness of the layer A included in the multilayer film according to the invention can range from 7 to 50 μm, preferably from 8 to 25 μm, even more preferentially from 10 to 20 μm.

The thickness of the tie layers B and C included in said multilayer film is, for its part, generally between 1 and 10 μm, and preferably between 2 and 8 μm.

The thickness of the 2 layers D and E, and also of the other layers optionally used in the multilayer film according to the invention, is capable of varying within a wide range of from 5 to 150 μm.

According to one implementation variant, the multilayer film according to the invention is a film comprising 5 layers consisting of the adhesive layer A, the 2 intermediate layers B and C and the 2 external layers D and E, according to the sequence D/B/A/C/E wherein the "/" sign signifies that the faces of the layers in question are in contact.

According to another implementation variant, the multilayer film according to the invention comprises, in addition to the 5 layers A, B, C, D and E, other thin layers required for the production of the packaging, such as for example:
- a rigid layer required for the mechanical strength of the receptacle, or
- a printable layer, or else
- a layer with a barrier effect against oxygen, water vapor or else carbon monoxide.

The materials that can be used to form said layers may be identical or different and generally comprise thermoplastic polymers which can be chosen from the polymers mentioned above for the layers D and E.

According to a more preferred implementation variant, the multilayer film according to the invention is a 7-layer film consisting of:
- the adhesive layer A,
- the 2 intermediate layers B and C, of which at least layer B consists of 50% to 85% by weight of (PE) grafted with the anhydride as defined above, and of 15% to 50% by weight of copolymer of ethylene and of propylene (EL1);
- a layer BO consisting of EVOH with a barrier effect against oxygen;
- a $3^{rd}$ intermediate layer B', the composition of which is as defined for composition (b), and preferably identical to that of layer B;
- a thin complexable layer D; and
- a thin sealable and splittable layer E;

according to the sequence D/B'/BO/B/A/C/E wherein the "/" sign signifies that the faces of the layers concerned are in contact.

Due to the contact between, on the one hand, the layer BO and, on the other hand, the layers B and B', said multilayer film exhibits improved cohesion, while being particularly suitable for the production of a resealable packaging which makes it possible to preserve for a longer period of time foodstuffs capable of reacting by oxidation with atmospheric oxygen, such as meat-based products.

The present invention also relates to a process for producing the multilayer film as defined above, characterized in that it comprises the coextrusion of the hot-melt pressure-sensitive adhesive composition (a), of the compositions (b) and (c), and of the constituent materials of the layers D and E.

Preferably, the constituent compositions and materials of the layers A, B, C, D and E are fed into the coextrusion device in the form of granules with a size of between 1 and 10 mm, preferably between 2 and 5 mm Thus, the pressure-sensitive adhesive composition (a) used in the multilayer film according to the invention makes it possible, in a particularly advantageous manner, to ensure both the properties required for said film and the possibility of presenting said composition (a) in the form of the abovementioned granules. The other layers optionally included in the multilayer film can be obtained either by incorporating into the coextrusion device the corresponding constituent materials in the form of granules of the same size, or by a process for complexing the film directly resulting from the coextrusion, for example using a polyurethane-based adhesive.

The adhesive composition (a) can be prepared, in this granule form, by simple hot-mixing of its ingredients, between 150 and 200° C., preferably at approximately 160° C., by means of a twin-screw extruder equipped with a tool for cutting the extruded product as it leaves the die.

The bubble-blowing coextrusion process (also known as "blow-molding coextrusion") is more particularly preferred. In a manner known to those skilled in the art, this process comprises:
- the melting, in separate extruders, of the constituent compositions and materials of the layers A, B, C, D and E, then
- the passing of the corresponding streams through a set of annular and concentric dies, so as to form a tubular bubble comprising several layers, in the order corresponding to that desired for the final structure, then
- the radial expansion (relative to the annular die) and the stretching (in the axial direction) of the bubble, then
- the cooling of the bubble.

The geometrical characteristics of the dies, like the parameters of the process, such as the degree of radial expansion and the drawing speed, are set so as to obtain the desired thickness for the various constituent layers of the multilayer film. For a more thorough description of the bubble-blowing coextrusion process, reference is in particular made to patent application US 2013/0029553.

The present invention also relates to the use of the multilayer film as described above, for producing resealable packagings.

The use for producing resealable trays is particularly advantageous, and according to one particularly preferred embodiment for producing the sealing film of these trays.

The examples that follow are given purely by way of illustration of the invention and should not in any way be interpreted in order to limit the scope thereof.

EXAMPLE A (REFERENCE): COMPOSITION (A) OF THE LAYER A

A composition consisting, on the basis of % weight/weight, of 59.5% of Kraton® D1113BT, 25% of Escorez® 1310 LC, 15% of Dercolyte® S115 and 0.5% of Irganox® 1010 is prepared, in the form of granules with a diameter of approximately 4 mm, by simply mixing the ingredients at 160° C. by means of a twin-screw extruder.

An MFI of 57 g/10 minutes is measured.

EXAMPLE B (REFERENCE): THREE-LAYER FILM D/A/E CONSISTING OF A LAYER A OF THE COMPOSITION OF EXAMPLE A

This three-layer film is produced by means of a continuously operating bubble-blowing coextrusion pilot-scale device, in which device 3 extruders are fed in the following way:
  one is fed with the composition (a) of example A, and the other two are fed with LDPE;
the 3 compositions being in the form of granules having a size of approximately 4 mm.

The process parameters are adjusted so as to produce a three-layer film consisting:
  as layer A, of a layer with a thickness of 15 µm consisting of the composition of example A,
  as complexable thin layer D, of a layer with a thickness of 25 µm consisting of LDPE;
  as a sealable and splittable thin layer E, a layer with a thickness of 10 µm also consisting of LDPE.

Among the parameters usually set, mention may made of a degree of radial expansion of the bubble equal to 3, a drawing speed of 7 m/minute and an overall throughput of 11 kg/hour.

The three-layer film thus obtained has a total thickness of 50 µm and a length of 50 m and is packaged in the form of a reel with a machine width of 250 mm.

Measurement of the First-Opening Force by Peeling in T at 23° C.:

A sample in the form of a rectangular sheet with A4 format (21×29.7 cm) is cut out from the three-layer film thus obtained.

The external face of the complexable layer D of this sample is:
  in a first step, subjected to a corona surface treatment (by means of a plasma), then
  in a second step, complexed (in other words laminated) on a PET film having a thickness of 23 µm by means of a polyurethane-based solvent-based adhesive and using a coating device of the Mayer bar type.

The rectangular sheet is then placed under pressure for 24 h.

Said rectangular sheet is then folded along a line located in its middle and parallel to the small side of the rectangle, which results in the sealable and splittable layer E being brought into contact with itself.

Partial sealing is then carried out using two heating clamping jaws at 130° C. applied under a pressure of 6 bar for 1 second, so as to obtain sealed regions of rectangular shape (8 cm in length and 1 cm in width) arranged perpendicularly to the line of folding. Each sealed zone is cut to obtain a tensile test specimen in which the sealed zone 8 cm in length is extended (to that of its ends which is opposite the line of folding) by 2 bands approximately 2 cm in length, left free and non-sealed.

These two free bands are attached to two holding devices (known as jaws) respectively connected to a stationary part and a movable part of a tensile testing device, which are located on a vertical axis. This tensile testing device is a dynamometer.

While a drive mechanism imparts a uniform rate of 300 mm/minute to the movable part, resulting in the peeling of the 2 sealed layers, the ends gradually move along a vertical axis with the formation of an angle of 180°. A force sensor connected to said movable part measures the force withstood by the test specimen thus held. The measurement is carried out in a climate-controlled room maintained at a temperature of 23° C.

The force obtained is shown in table 1.

Measurement of the Second-Opening Force by Peeling in T at 23° C.:

The 2 parts of the preceding test specimen are, after peeling, repositioned facing one another and brought into contact manually. They are then subjected to a pressure exerted by means of a roller with a weight of 2 kg, with which a to-and-fro movement is carried out in a direction parallel to the length of the test specimen.

A tensile test specimen is thus obtained which is identical in shape to that prepared for the preceding peeling test, which is then repeated.

The force obtained is shown in table 1.

EXAMPLE 1: FILM COMPRISING 5 LAYERS D/B/A/C/E WITH LAYER A CONSISTING OF THE COMPOSITION OF EXAMPLE A AND LAYERS B AND C CONSISTING OF ADMER™ AT1955E

Example B is repeated by modifying the coextrusion process so as to add to the three-layer film 2 layers B and C having the same thickness of 5 µm and the same composition, namely the product Admer™ AT1955E as shown in table 1.

A 5-layer film with a total thickness equal to 60 µm is obtained.

The $1^{st}$-opening and $2^{nd}$-opening forces are shown in table 1.

EXAMPLE 2: FILM COMPRISING 5 LAYERS D/B/A/C/E WITH LAYER A CONSISTING OF THE COMPOSITION OF EXAMPLE A AND LAYERS B AND C CONSISTING OF 95% OF LDPE AND 5% OF THE COMPOSITION OF EXAMPLE A

Example 1 is repeated by modifying the coextrusion process so as to add to the three-layer film 2 layers B and C having the same thickness of 5 µm and the same composition. Said composition consists (by weight) of 95% of LDPE and of 5% of the composition of example A. The composition of the 2 layers B and C is obtained by feeding the corresponding extruders with the appropriate amount of LDPE granules and granules of the composition of example A.

The $1^{st}$-opening and $2^{nd}$-opening forces are shown in table 1.

EXAMPLES 3-5: FILM COMPRISING 5 LAYERS D/B/A/C/E WITH LAYER A CONSISTING OF THE COMPOSITION OF EXAMPLE A AND LAYERS B AND C CONSISTING OF LDPE AND OF THE COMPOSITION OF EXAMPLE A

Example 2 is repeated using as constituent material of the 2 tie layers B and C that indicated in table 1.

The $1^{st}$-opening and $2^{nd}$-opening forces are also shown in table 1.

The results for $1^{st}$-opening forces obtained for examples 1-5 are of the same order of magnitude as that obtained for example B, and correspond to an entirely acceptable resealable packaging opening quality.

The results obtained for the $2^{nd}$-opening force reveal a clear increase compared to example B, thereby significantly indicating an improvement in the quality of the resealing of the resealable packaging, following the $1^{st}$ opening thereof.

TABLE 1

|  | Example B | Example 1 | Example 2 | Example 3 | Example 4 | Example 5 |
|---|---|---|---|---|---|---|
| Constituent material of the 2 tie layers B and C | Not involved | Admer ™ AT1955E | 95% LDPE and 5% composition example A | 90% LDPE and 10% composition example A | 80% LDPE and 20% composition example A | 70% LDPE and 30% composition example A |
| $1^{st}$-opening force (N/cm) | 4.93 | 6.80 | 4.73 | 4.65 | 5.32 | 5.88 |
| $2^{nd}$-opening force (N/cm) | 0.96 | 2.98 | 1.26 | 1.33 | 1.32 | 1.27 |

The invention claimed is:

1. A multilayer film comprising 2 thin layers D and E of a thermoplastic material bonded together by a continuous layer A which has a thickness ranging from 7 to 50 μm, and consists of a hot-melt pressure-sensitive adhesive (HMPSA) composition (a) comprising, on the basis of the total weight of said composition:
   from 40% to 70% by weight of a composition (a1) of styrene block copolymers comprising at least one elastomer block, said composition (a1) consisting of, on the basis of its total weight:
   30% to 90% by weight of at least one diblock copolymer selected from the group consisting of polystyrene-polyisoprene (SI), polystyrene-polybutadiene-polyisoprene (SBI), polystyrene-polyisoprene-polybutadiene (SIB), polystyrene-polybutadiene (SB), polystyrene-poly(ethylenebutylene) (SEB) and polystyrene-poly(ethylenepropylene) (SEP), and
   10% to 70% by weight of at least one triblock copolymer selected from the group consisting of polystyrene-polyisoprene-polystyrene (SIS), polystyrene-polyisoprene-polybutadiene-polystyrene (SIBS), polystyrene-polybutadiene-polystyrene (SBS), polystyrene-poly(ethylenebutylene)-polystyrene (SEBS) and polystyrene-poly(ethylenepropylene)-polystyrene (SEPS);
   the total content of styrene units of said composition (a1) ranging from 10% to 40% by weight on the basis of the total weight of (a1); and
   from 30% to 60% by weight of one or more tackifying resins (a2);
   wherein, the adhesive layer A is:
   connected to the layer D by a tie layer B, and
   connected to the layer E by a tie layer C;
   each of the 2 layers B and C respectively consisting of a composition (b) and (c) each comprising:
   a polyolefin (P) selected from the group consisting of a polyethylene (PE) and a polypropylene (PP), optionally modified with an unsaturated carboxylic anhydride which is either a ring comprising 4 or 5 carbon atoms or a linear chain comprising 6 or 8 carbon atoms; and
   at least one elastomer compound (EL) selected from the group consisting of a copolymer of ethylene and of propylene (EL1) and a styrene block copolymer (EL2) comprising at least one elastomer block, the styrene block copolymer (EL2) being in the form of a diblock and triblock composition as defined for the composition (a1).

2. The multilayer film as claimed in claim 1, wherein the composition (a1) consists of a polystyrene-polyisoprene-polystyrene (SIS) triblock copolymer and a polystyrene-polyisoprene (SI) diblock copolymer.

3. The multilayer film as claimed in claim 1, wherein the tackifying resin(s) (a2) have weight-average molar masses $M_w$ of generally between 300 and 5000 Da and are:
   (i) rosins of natural origin or modified rosins;
   (ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;
   (iii) terpene resins generally resulting from the polymerization of terpene hydrocarbons, which are optionally modified by the action of phenols; and/or
   (iv) copolymers based on natural terpenes.

4. The multilayer film as claimed in claim 1, wherein each of the constituent compositions (b) and (c) of the tie layers B and C comprises:
   from 50% to 98% by weight of the polyolefin (P); and
   from 2% to 50% by weight of the elastomer compound (EL);
   based on the total weight of said composition.

5. The multilayer film as claimed in claim 1, wherein the polyolefin (P) included in at least one of the compositions (b) and (c) is a (PE).

6. The multilayer film as claimed in claim 1, wherein the polyolefin (P) included in at least one of the compositions (b) and (c) is a (PE) grafted with maleic anhydride.

7. The multilayer film as claimed in claim 1, wherein at least one of the constituent compositions (b) and (c) of the tie layers B and C comprises:
   from 50% to 85% by weight of (PE) grafted with maleic anhydride; and
   from 15% to 50% by weight of copolymer of ethylene and of propylene (EL1).

8. The multilayer film as claimed in claim 1, wherein at least one of the constituent compositions (b) and (c) of the tie layers B and C comprises:
from 70% to 98% by weight of (PE); and
from 2% to 30% by weight of styrene block copolymer (EL2) comprising at least one elastomer block.

9. The multilayer film as claimed in claim 1, wherein the styrene block copolymer (EL2) is included in a hot-melt pressure-sensitive adhesive (HMPSA) composition which is as defined for the hot-melt pressure-sensitive adhesive (HMPSA) composition (a).

10. The multilayer film as claimed in claim 1, wherein the compositions (b) and (c) of the layers B and C are identical.

11. The multilayer film as claimed in claim 1, which is a film comprising 5 layers consisting of the adhesive layer A, the 2 intermediate layers B and C and the 2 external layers D and E, according to the sequence D/B/A/C/E wherein the "/" sign signifies that the faces of the layers in question are in contact.

12. A process for producing the multilayer film as defined in claim 1, comprising coextruding the hot-melt pressure-sensitive adhesive composition (a), of the compositions (b) and (c), and of the constituent materials of the layers D and E.

13. The process for producing the multilayer film as claimed in claim 12, wherein the coextrusion is carried out by bubble blowing.

14. A resealable packaging comprising in said resealable packaging a multilayer film according to claim 1.

15. The multilayer film as claimed in claim 1, wherein the polyolefin (P) included in at least one of the compositions (b) and (c) is a (LDPE).

16. The multilayer film as claimed in claim 1, wherein the polyolefin (P) included in at least one of the compositions (b) and (c) is a (LLDPE) grafted with maleic anhydride.

17. The multilayer film as claimed in claim 1, wherein the at least one elastomer compound (EL) is a copolymer of ethylene and of propylene (EL1).

18. The multilayer film as claimed in claim 1, wherein the at least one elastomer compound (EL) is a styrene block copolymer (EL2).

19. The multilayer film as claimed in claim 1, wherein said composition (a1) contains 50% to 60% by weight of the at least one diblock copolymer.

* * * * *